United States Patent
Kabatzke et al.

(10) Patent No.: US 7,704,043 B2
(45) Date of Patent: Apr. 27, 2010

(54) METHOD FOR TORQUE AND PITCH CONTROL FOR A WIND POWER PLANT ACCORDING TO THE ROTATION SPEED

(75) Inventors: Wolfgang Kabatzke, Geesthacht (DE); Kay Richter, Norderstedt (DE); Thomas Schubert, Ellerau (DE)

(73) Assignee: Nordex Energy GmbH, Norderstedt (DE)

( * ) Notice: Subject to any disclaimer, the term of this patent is extended or adjusted under 35 U.S.C. 154(b) by 568 days.

(21) Appl. No.: 11/605,750

(22) Filed: Nov. 29, 2006

(65) Prior Publication Data

US 2007/0154311 A1    Jul. 5, 2007

(30) Foreign Application Priority Data

Dec. 15, 2005  (DE) ................. 10 2005 059 888

(51) Int. Cl.
*F03D 7/04*   (2006.01)
(52) U.S. Cl. .............................. 416/1; 416/44
(58) Field of Classification Search .............. 416/1, 416/44; 290/44, 55
See application file for complete search history.

(56) References Cited

U.S. PATENT DOCUMENTS

| | | | |
|---|---|---|---|
| 4,565,929 A * | 1/1986 | Baskin et al. ................ | 290/44 |
| 4,703,189 A | 10/1987 | DiValentin et al. | |
| 5,289,041 A * | 2/1994 | Holley ......................... | 290/44 |
| 2006/0273595 A1* | 12/2006 | Avagliano et al. .......... | 290/44 |

FOREIGN PATENT DOCUMENTS

EP    1 007 844 B1    7/2004

OTHER PUBLICATIONS

"Pitch-controlled variable speed Wind Turbine Generation", E. Muljadi et al, Industry Appln Conference 1999, pp. 323-330.
"Wind Turbine Control Algorithms" by E. L. van der Hooft et al, ECN Literature Review, (Dec. 1, 2003) pp. 1-89.
"The Design of Closed Loop Controllers for Wind Turbines", by E. A. Bossanyi, Wind Energy, (Jan. 1, 2000), pp. 149-163.
"Wind Turbine Control for Load Reduction", by E. A. Bossanyi, Wind Energy, (Jan. 1, 2003), pp. 229-244.

* cited by examiner

*Primary Examiner*—Ninh H Nguyen
(74) *Attorney, Agent, or Firm*—Vidas, Arrett & Steinkraus, P.A.

(57) ABSTRACT

Method for torque and pitch control/adjustment for a wind power plant according to the rotational speed according to a characteristic curve, in which at partial load operation in a first section the torque is adjusted up to a first predetermined rotational speed, at partial load operation in a second section the torque is adjusted from the first rotational speed up to a second rotational speed, at full load operation in a third section at least one pitch of a rotor blade is adjusted for rotational speeds greater than the second rotational speed, at full load operation, in a fourth section, the pitch is adjusted for rotational speeds lower than the second rotational speed and greater than the third rotational speed, if a control has been previously carried out according to the third section, and at partial load operation in a fifth section the torque is adjusted for rotational speeds lower than the third rotational speed, if a control has been previously carried out according to the fourth section.

12 Claims, 1 Drawing Sheet

Figure 1:
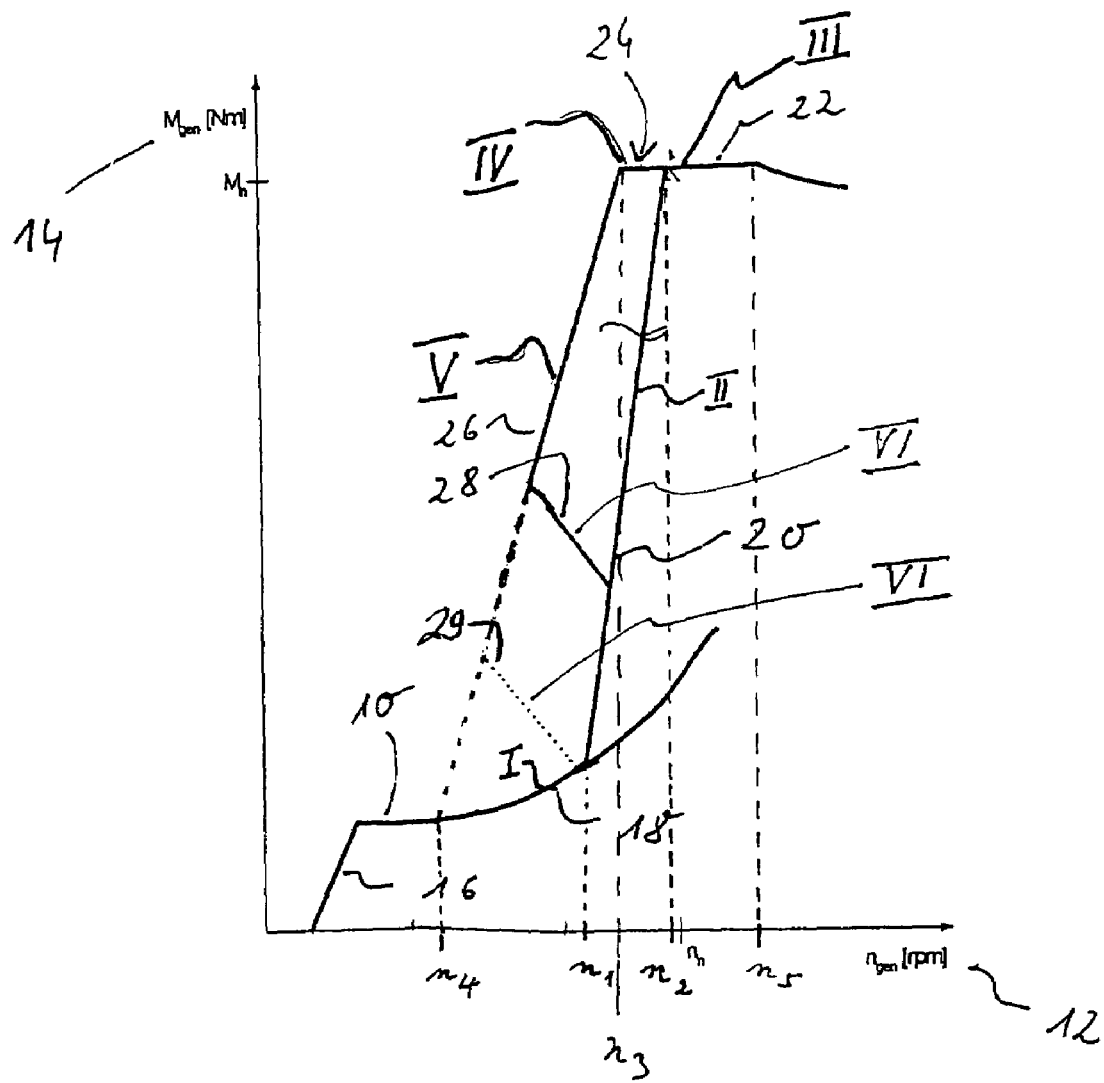

METHOD FOR TORQUE AND PITCH CONTROL FOR A WIND POWER PLANT ACCORDING TO THE ROTATION SPEED

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for torque and pitch control/adjustment for a wind power plant according to the rotational speed. The method serves to determine an optimal reference value for the generator torque according to the rotational speed for a pitch controlled wind power plant.

The wind power plant is started up by the control system in windy conditions, from a start-up wind rotational speed, and shut off again at high wind speed, the shut-off wind rotational speed, in order to prevent mechanical overload. The wind speed is, for example, detected via an anemometer or calculated from the rotational speed of the rotor and the power produced.

Pitch-controlled wind power plants operating at variable rotational speeds are known. During pitch control, the blade pitch of each rotor blade is adjusted about its longitudinal axis. At different blade pitches, the respective rotor blade collects a different torque from the wind.

For the control/adjustment of the wind power plant it is known to distinguish between two modes of operation. The first mode of operation is denoted as partial load operation in which the rotational speed is regulated by setting the torque. The second mode of operation is full load operation in which the rotational speed is regulated by adjusting the pitch.

In order to achieve optimal power output by the wind power plant, the rotational speed of the plant in the partial load range is set at the optimal ratio between the peripheral rotational speed of the rotor and the wind speed ($\lambda_{opt}$). The rotor blades are, therefore, set at a blade angle which generates the highest drive torque for the rotor shaft. The rotational speed of the rotor is set in the partial load range by the counter torque generated on the generator and/or convertor.

If, at a nominal wind speed, the maximum counter torque is reached on the generator, by further increasing the generator torque, the rotational speed may no longer be maintained at the operating point. An overload of the system is, therefore, avoided as the aerodynamic efficiency of the blades deteriorates and said blades are moved out of the optimum pitch. The specialist term for this process is also "to pitch". The rotational speed of the rotor is thus influenced by the pitch of the blades after reaching the maximum generator torque.

A variable speed wind power plant is known from EP 1 007 844 B1, the entire contents of which is incorporated hereby by reference, which has a wound rotor induction generator. For operating the known wind power plant, a torque controller is known and a pitch controller which operates independently of the torque controller.

The technical object of the invention is to provide a method for torque and pitch control for a wind power plant according to the rotational speed, which delivers a particularly high output.

BRIEF SUMMARY OF THE INVENTION

The method according to the invention serves for controlling torque and pitch according to the rotational speed. In this connection, the control is carried out according to a predetermined characteristic curve. The characteristic curve predetermines a reference value for the generator torque according to a rotational speed for the rotor, i.e. a reference value for the torque applied to the generator. The reference value for the generator is then set or adjusted by a corresponding control system. In order to achieve the desired reference value, the control system alters both the power received by the generator and the pitch of the rotor blades. The control system may also be configured as an automatic control system. At partial load operation on the wind power plant, in a first section, the torque is adjusted up to a first rotational speed ($n_1$). The second section adjoins the first section, and in which, also at partial load operation, the torque is adjusted from the first predetermined rotational speed ($n_1$) up to the second rotational speed ($n_2$). At full load operation, in a third section, the pitch is adjusted for rotational speeds greater than the second rotational speed ($n_2$). At full load operation, in a fourth section, the pitch is also adjusted for rotational speeds greater than a third rotational speed ($n_3$) and lower than the second rotational speed ($n_2$). At partial load operation, in a fifth section, the torque is adjusted for rotational speeds lower than the third rotational speed ($n_3$), if a control has been previously carried out according to the fourth section of the characteristic curve. The method according to the invention has a torque adjustment at partial load operation which is only triggered if a control has been previously carried out according to the fourth section. With the method according to the invention, therefore, at full load operation a pitch adjustment is further carried out in a rotational speed range between the second rotational speed ($n_2$) and the third rotational speed ($n_3$), instead of changing to partial load operation. If the rotational speed of the rotor drops further, the torque is adjusted according to the fifth section at partial load operation, the control system returning in a linear manner to the second or first section, preferably when reaching a minimum pitch.

Particularly preferably, the control according to the fourth section of the characteristic curve is carried out if the pitch of the rotor blades exceeds a predetermined value. With the method according to the invention, therefore, at full load operation, at a rotational speed between $n_2$ and $n_3$ it is monitored whether a predetermined minimum pitch is exceeded. If the pitch is exceeded, sufficient kinetic "energy" is still present in the rotor blade to avoid an immediate return to partial load operation. Furthermore, an adjustment of the pitch is also carried out, therefore, at lower rotational speeds than the second rotational speed $n_2$. The characteristic curve is branched at the fourth section. The minimum pitch is preferably greater than 0.5° and lower than 5°. In a particularly preferred embodiment the size of the pitch is between 1° and 3°.

If, for rotational speeds lower than $n_2$, there is still a sufficiently large pitch, the control system remains at full load operation and an adjustment of the pitch takes place, the control system then returning to partial load operation. To this end, the torque is preferably reduced and the rotational speed increased until a rotational speed of the second section is present. The characteristic curve where a return is made from the full load operation, with the fourth and fifth characteristic curve sections, into the second characteristic curve section for the partial load, is hereinafter denoted as the sixth characteristic curve section.

The continuation of the full load operation in the fourth section of the characteristic curve offers the advantage that switching back to partial load operation only occurs later and thus the wind power plant is operated longer at full load.

With the method according to the invention, in the first section of the characteristic curve, the torque is increased at increasing rotational speed, until the rotational speed has reached a predetermined rotational speed value $n_1$. Preferably in the second section of the characteristic curve, the torque rises at increasing rotational speed more rapidly than in the first section. In the third section, the torque is adjusted to a constant value. From a fifth rotational speed $n_5$, a drop in torque is triggered, expediently, at increasing rotational speed. By means of the drop in torque, an overload of the wind power plant is avoided at high rotational speeds.

Preferably in the fourth section of the characteristic curve, the pitch is adjusted to a substantially constant torque value. Expediently, the torque increases in the fifth section of the characteristic curve more rapidly than in the first section of the characteristic curve, so that the wind power plant at a low rotational speed may be moved back from the full load operation to the first characteristic curve. The rise of the characteristic curve in the second section, which means a large torque increase at a small increase in rotational speed, serves the purpose of reaching full load operation as quickly as possible after start-up, beyond the partial load operation, in order to be able to drive the wind power plant as soon as possible at full load operation.

With the method according to the invention, the third rotational speed $n_3$ is greater and the fourth rotational speed $n_4$ is lower than the first rotational speed $n_1$.

BRIEF DESCRIPTION OF THE VIEW OF THE DRAWING

The method according to the invention is described hereinafter with reference to FIG. 1 in more detail.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows a set of characteristic curves for the control behaviour of a wind power plant with a characteristic field regulation. The characteristic field regulation has a first section identified by 10, in which the generator torque 14 is applied by the generator rotational speed 12. In a first start-up section 16 of the characteristic curve section 10, the generator torque increases in a linear manner with the rotational speed. A second part 18 of the first section is adjacent thereto, in which the torque does not follow the rotational speed in a linear manner. The torque increases, therefore, up to a first rotational speed value $n_1$. In the second part of the first section of the characteristic curve, an adjustment of the generator torque is carried out according to the ideal characteristic curve for the power received from the wind. The mathematical relationship between the rotational speed and the power results from the following formula:

$$P_{Aero} = \left[2 \cdot \pi \cdot r_{rot} \cdot \frac{n_{gen}}{\ddot{u}_{getr}} \cdot \frac{1}{60} \cdot \frac{1}{\lambda(n_{rot})}\right]^3 \cdot \pi \cdot r_{rot}^2 \cdot \frac{\rho_{luft}}{2} \cdot c_p(n_{rot})$$

$r_{rot}$ representing the radius of the rotor blade, $n_{gen}$ representing the generator rotational speed and $\ddot{u}_{getr}$ representing the transmission ratio of the gear box. $\lambda(n_{rot})$ denotes the high speed index of the rotor according to the rotational speed of the rotor, $\rho_{luft}$ denotes the density of the air, whilst $c_p(n_{rot})$ describes a power coefficient for the rotor blade according to the rotational speed of the rotor.

The aforementioned relationship for the power may be continually calculated according to the technical design of the control system, or stored in a table, according to the rotational speed. The use of the physical relationship between power received from the wind and the generator power ensures that, in the range between the rotational speed values of $n_4$ and $n_1$, the maximum power output is always applied.

The second characteristic curve section 20 adjoins the first rotational speed value. In the second section 20 of the characteristic curve, the torque rises rapidly to the nominal value $M_n$ for the torque. The rotational speed increases, therefore, from the value $n_1$ to the second rotational speed value $n_2$. The second rotational speed $n_2$ may, therefore, be the same or lower than a nominal rotational speed $n_n$ for the wind power plant. In an adjoining section 22 of the characteristic curve, the full load operation is present in which an adjustment is carried out of the pitch angle. The third characteristic curve section 22 applies to rotational speeds over $n_2$. Over a fifth rotational speed $n_5$, the torque applied to the rotor is reduced by the pitch adjustment. The power of the wind power plant is proportional to the torque and the rotational speed, so that a reduction in power occurs above $n_5$ in the third section of the characteristic curve.

The fourth section 24 of the characteristic curve adjoins the third section 22 of the characteristic curve. The associated rotational speed range is characterised by the rotational speed values $n_2$ and $n_3$. Full load operation is present in the fourth section of the characteristic curve, moreover, although during start-up of the plant, full load operation has not yet occurred at these rotational speeds.

With a drop in the rotational speed beyond the value $n_3$, the torque is reduced along the fifth section of the characteristic curve. The reduction is carried out in a substantially linear manner. At the rotational speed value $n_4$, the characteristic curve returns to the first characteristic curve section. The rotational speed value $n_4$, along the fifth characteristic curve section, is however only reached theoretically, as in the fourth and fifth characteristic curve sections it is continually monitored whether the pitch of the rotor blade still exceeds a predetermined minimum value, for example 2°. If the minimum value for the pitch is not exceeded, i.e. at full load operation the pitch has reduced to such an extent in the intervening period that it is lower than the minimum value, the control system returns along a sixth characteristic curve section 28 or 29, until values are again reached from the first and/or second characteristic curve. The fifth characteristic curve section, therefore, forms the envelope of the curve values, proceeding from which the control system returns via the sixth characteristic curve section 28 from full load operation to partial load operation. In contrast to the other characteristic curve sections, the sixth characteristic curve section is not fixed in its absolute position but defined by its negative gradient and its starting point on the fifth characteristic curve section. The starting point on the fifth characteristic curve section is defined by the minimum value for the pitch. In the figure, for example, two characteristic curve branches 28 and 29 are shown, along which a return is made to partial load operation.

The characteristic curve used with the method according to the invention has a hysteresis, which leads to an improved power output by the wind power plant. In this connection, the transition from the third characteristic curve section 22 to the fourth characteristic curve section 24 is important. It is hereby defined that the control according to the fourth characteristic curve section 24 takes place when, for a rotational speed from the range [$n_3$, $n_2$], an adjustment angle is present which is greater than a defined minimum angle. Preferably a minimum angle of 2° is defined. If, therefore, at a drop in the rotational speed a pitch of 2° or more is still present, the control system does not return, as with a purely rotational speed control, to the second section 20 of the characteristic curve, but remains at full load operation and switches to the fourth section. The background to this is that the system uses the kinetic energy stored during the motion of the rotor in order to continue to generate a maximum torque. Only when a lower limit for the full load operation $n_3$ has been reached, does the control system return to the partial load operation according to the fifth section, as the torque is reduced. The minimum value for the pitch for the return to partial load operation is not necessarily identical to the minimum angle which is provided for the branching into the fourth characteristic curve section.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Method for torque and pitch control/adjustment for a wind power plant according to the rotational speed according to a characteristic curve, in which at partial load operation in a first section (10) the torque is adjusted up to a first predetermined rotational speed ($n_1$), at partial load operation in a second section (20) the torque is adjusted from the first rotational speed ($n_1$) up to a second rotational speed ($n_2$), at full load operation in a third section (22) at least one pitch of a rotor blade is adjusted for rotational speeds greater than the second rotational speed ($n_2$), at full load operation, in a fourth section (24), the pitch is adjusted for rotational speeds lower than the second rotational speed ($n_2$) and greater than the third rotational speed ($n_3$), if a control has been previously carried out according to the third section (22), and at partial load operation in a fifth section (26) the torque is adjusted for rotational speeds lower than the third rotational speed ($n_3$), if a control has been previously carried out according to the fourth section (24).

2. Method according to claim 1, characterised in that in the fourth and fifth sections (26) of the characteristic curve, when exceeding a minimum pitch, the control system returns via a sixth characteristic curve section (28; 29) to the first or second characteristic curve section (18, 20).

3. Method according to claim 2, characterised in that in the sixth characteristic curve section (28; 29) the torque is reduced according to the rotational speed.

4. Method according to claim 1, characterised in that the fourth section of the characteristic curve is triggered if the pitch of the rotor blades exceeds a predetermined minimum value at full load operation.

5. Method according to claim 4, characterised in that the predetermined minimum value for the pitch is greater than 0.5° and lower than 5°.

6. Method according to claim 5, characterised in that the predetermined value for the pitch is greater than 1° and lower than 3°.

7. Method according to claim 1, characterised in that in the first section (10) of the characteristic curve, the torque rises with the rotational speed, until the rotational speed has reached a predetermined rotational speed value ($n_2$).

8. Method according to claim 1, characterised in that in the second section (20) of the characteristic curve, the torque rises more rapidly with the rotational speed than in the first section.

9. Method according to claim 1, characterised in that in the third section, up to a predetermined rotational speed ($n_5$), an adjustment is carried out to a constant value.

10. Method according to claim 9, characterised in that in the third section of the characteristic curve, beyond the rotational speed ($n_5$), where the rotational speed increases, the torque drops.

11. Method according to claim 1, characterised in that in the fifth section (26) of the characteristic curve, the torque rises more rapidly with the rotational speed than in the first section (10).

12. Method according to claim 1, characterised in that the third rotational speed ($n_3$) is lower than the second rotational speed ($n_2$).

* * * * *